B. C. MUDGE.
MACHINE FOR TREATING FIBROUS PLANTS.
APPLICATION FILED OCT. 30, 1907.
905,345.
Patented Dec. 1, 1908.
8 SHEETS—SHEET 1.
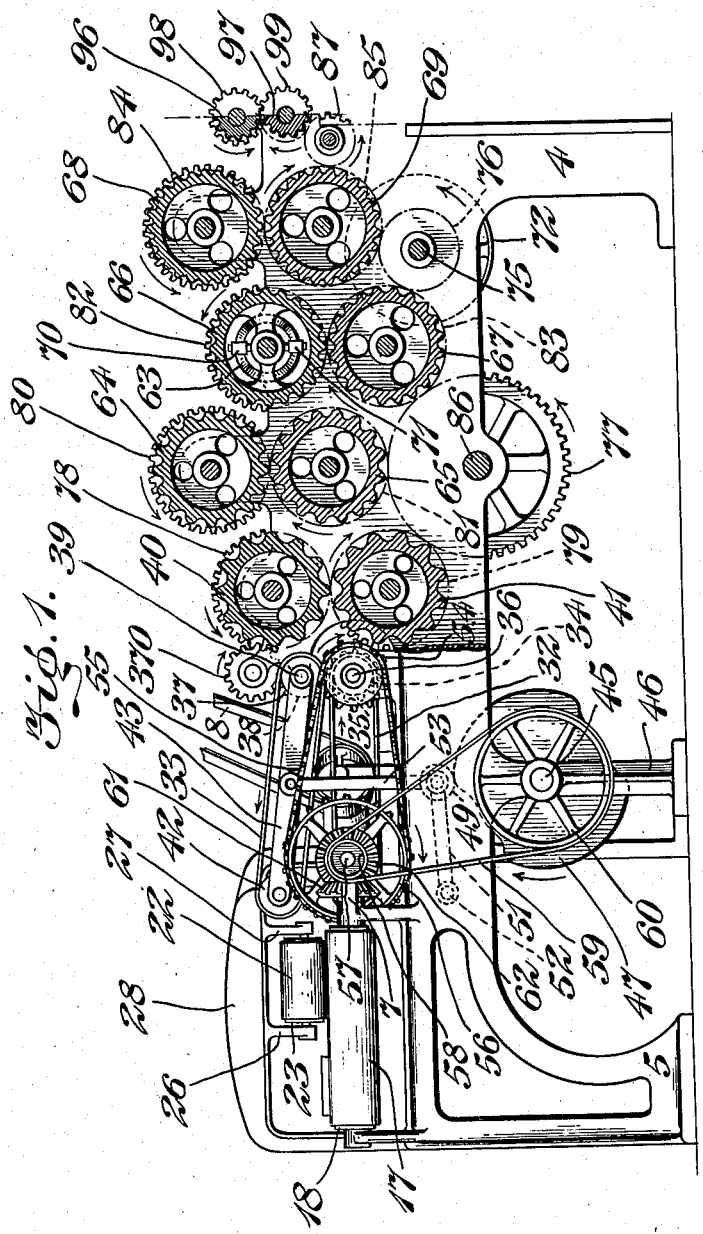
Witnesses
Chas. W. La Rue
A. C. Abbott
Inventor
Benjamin C. Mudge
By Wilbur M. Stone
Attorney

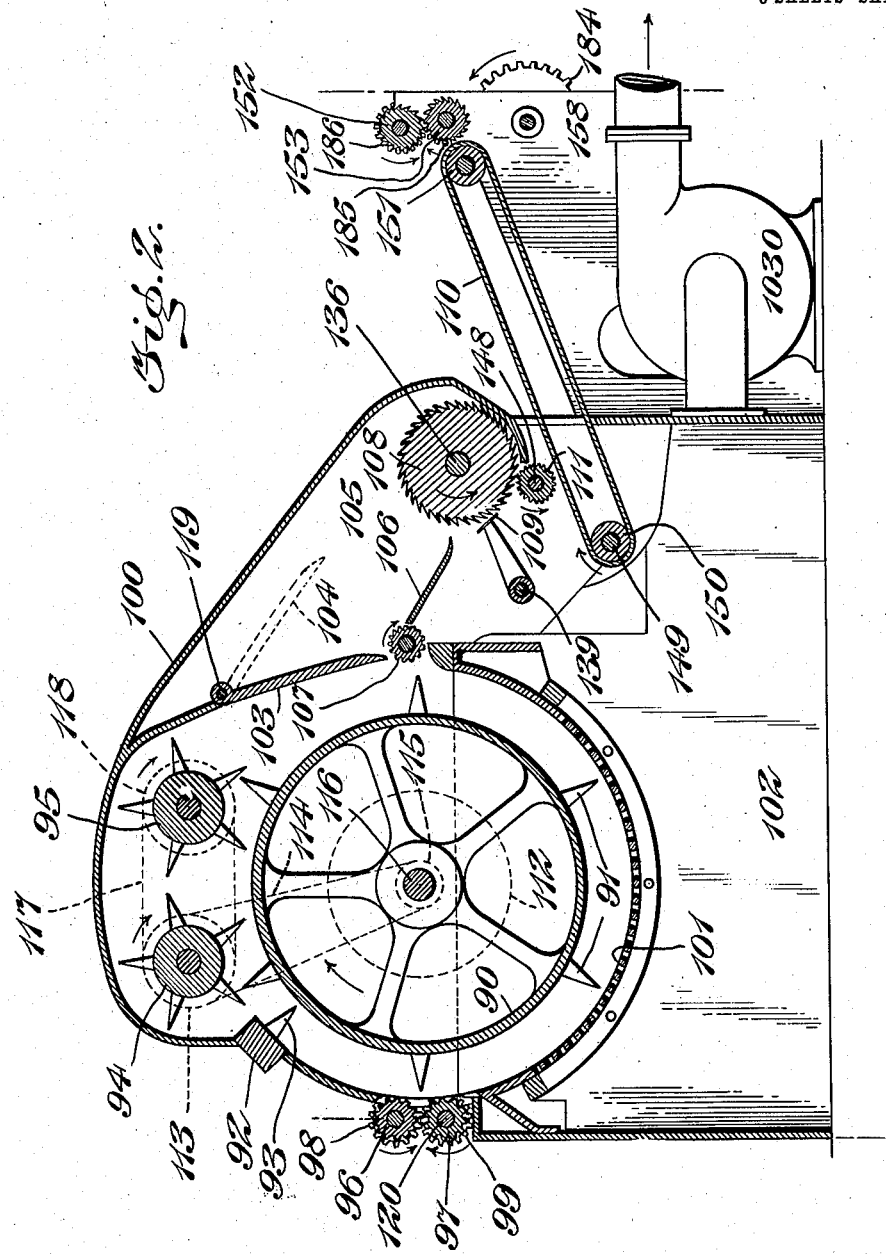

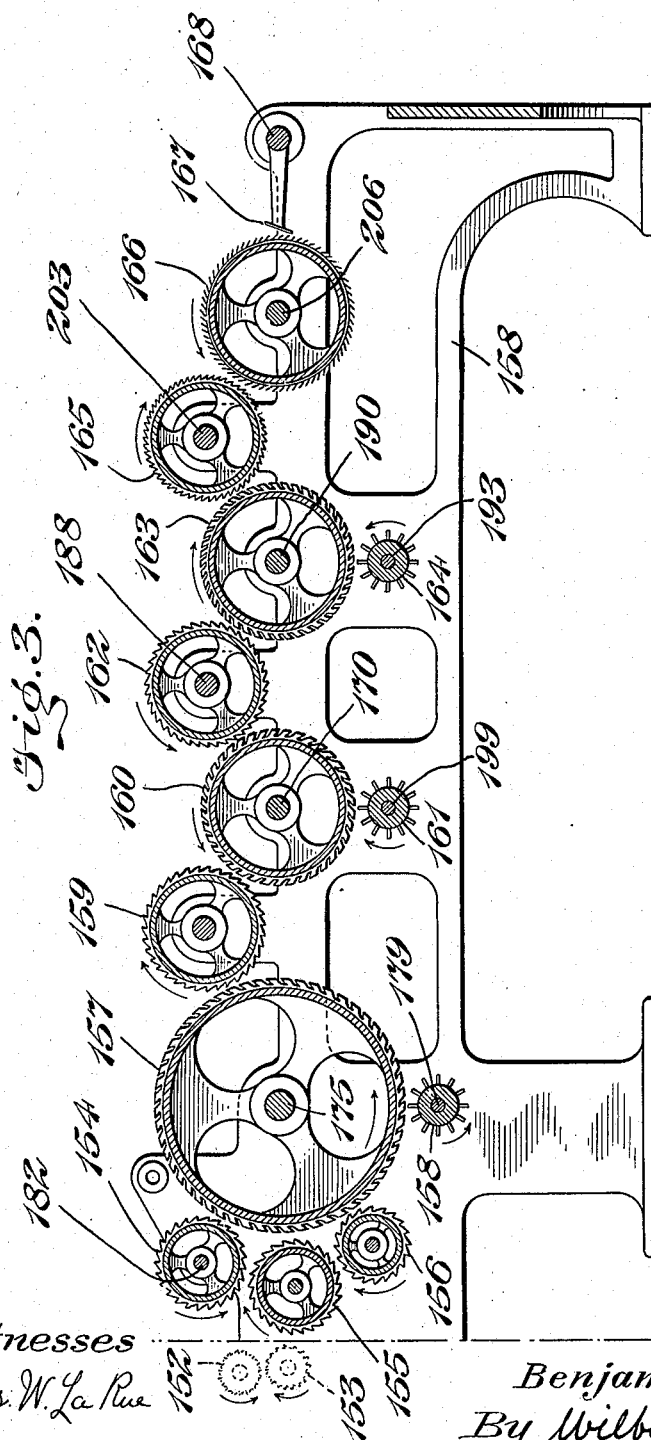

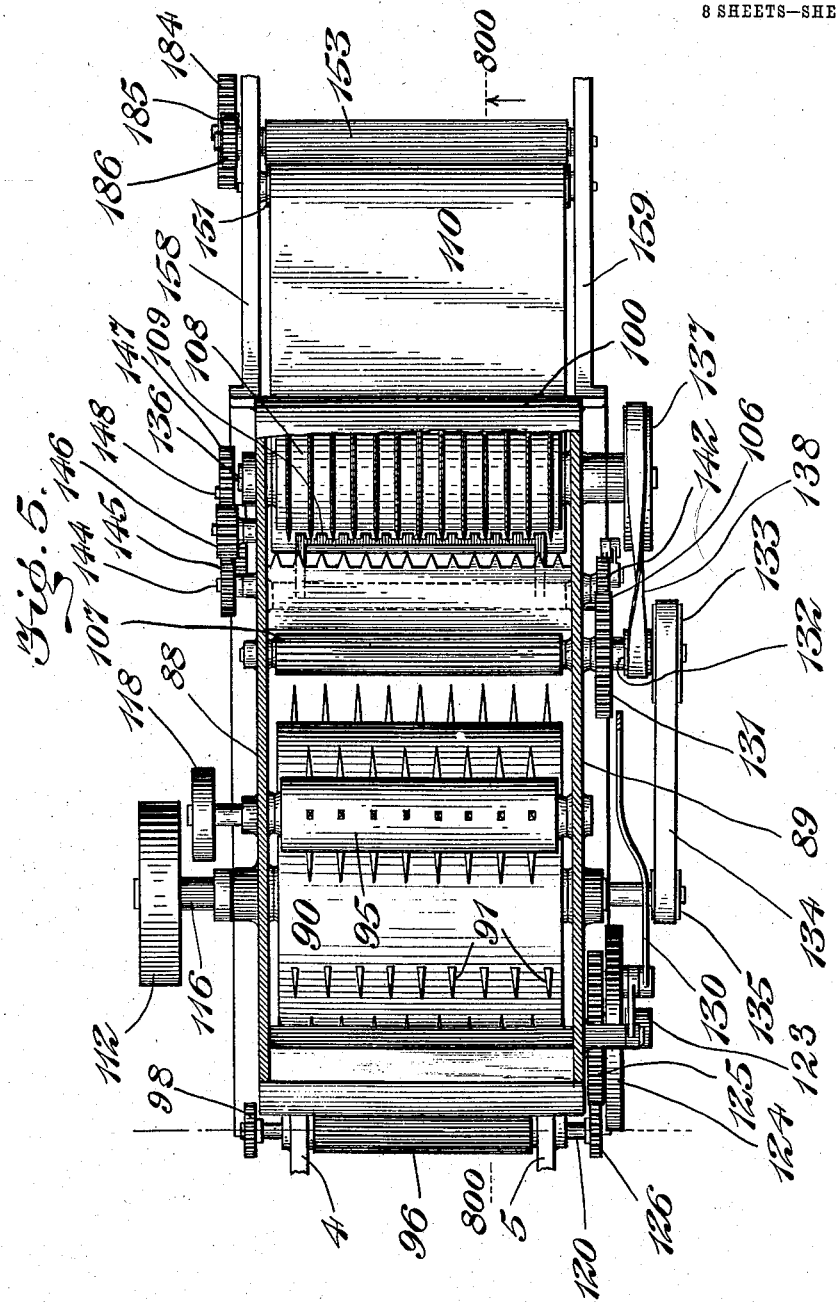

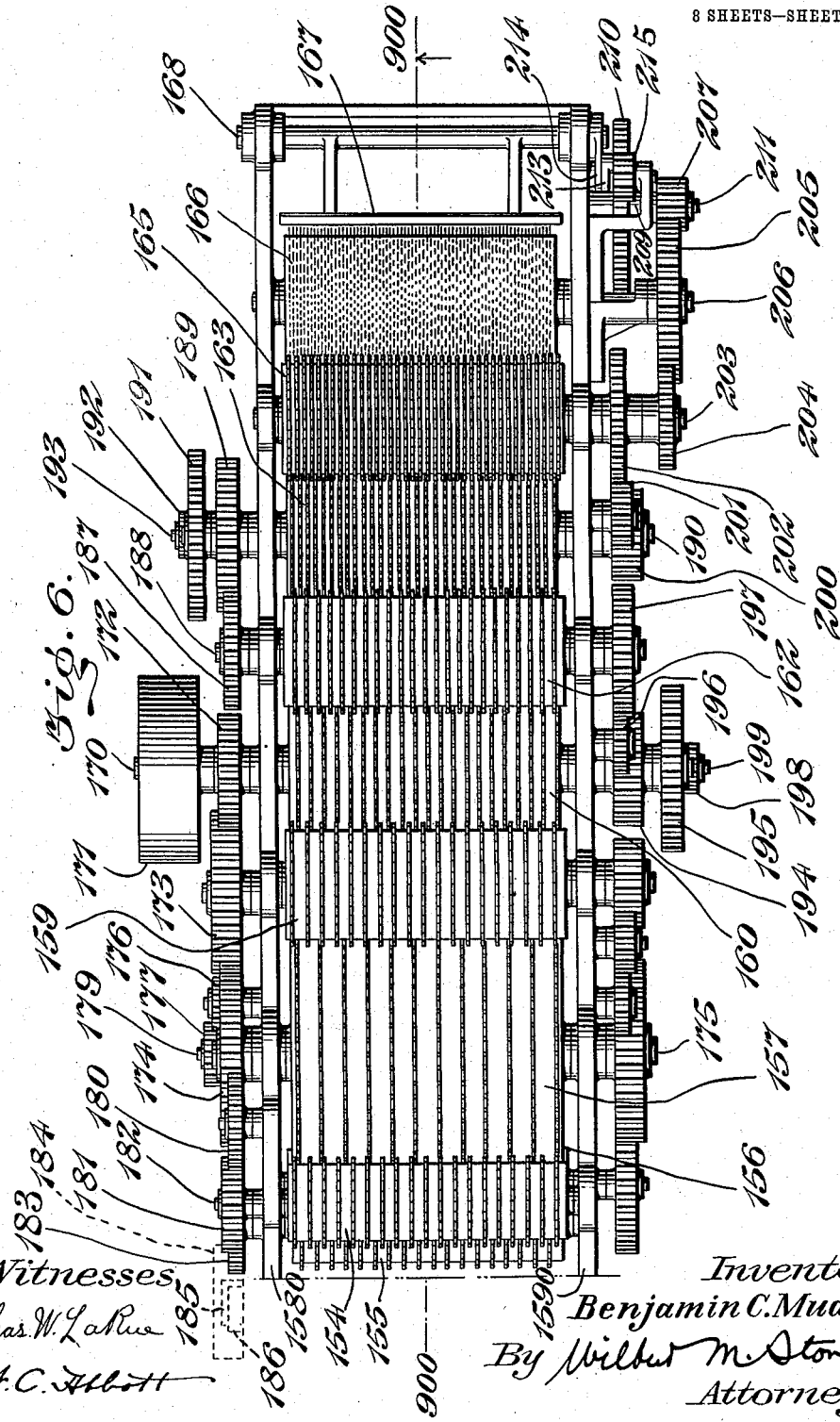

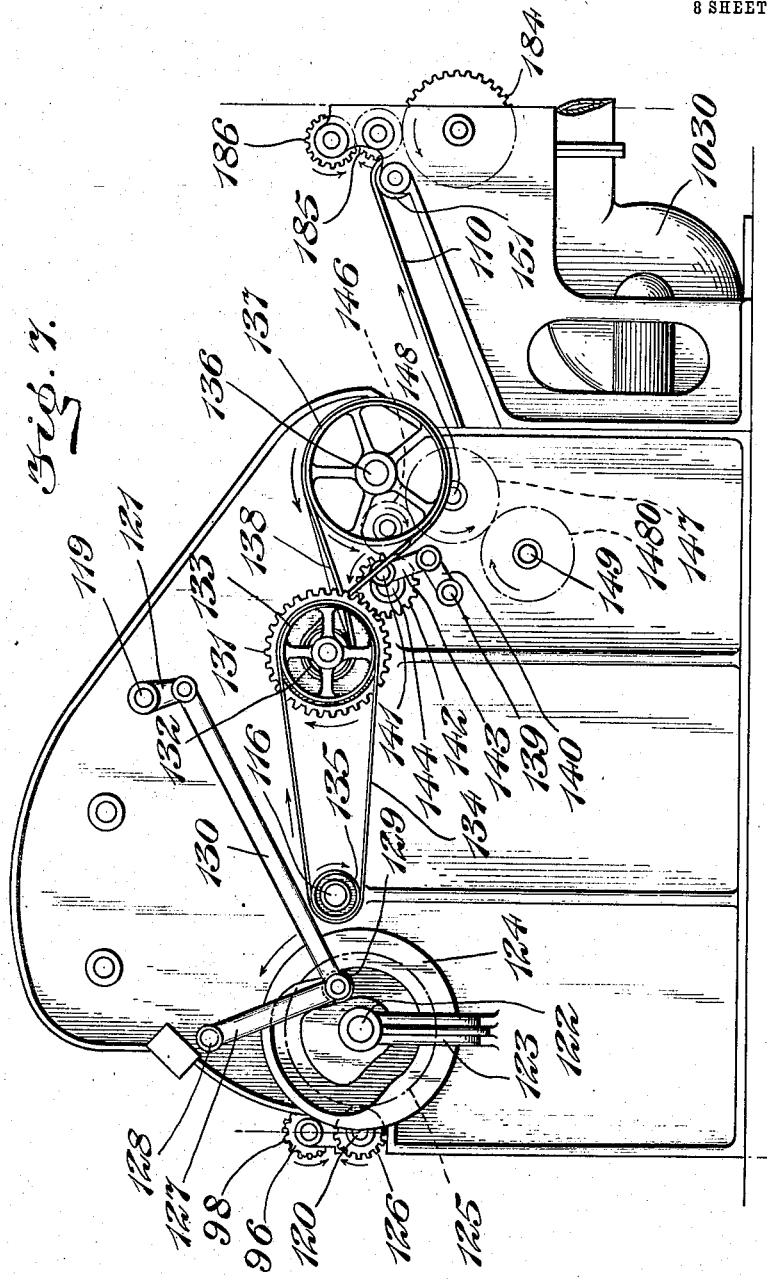

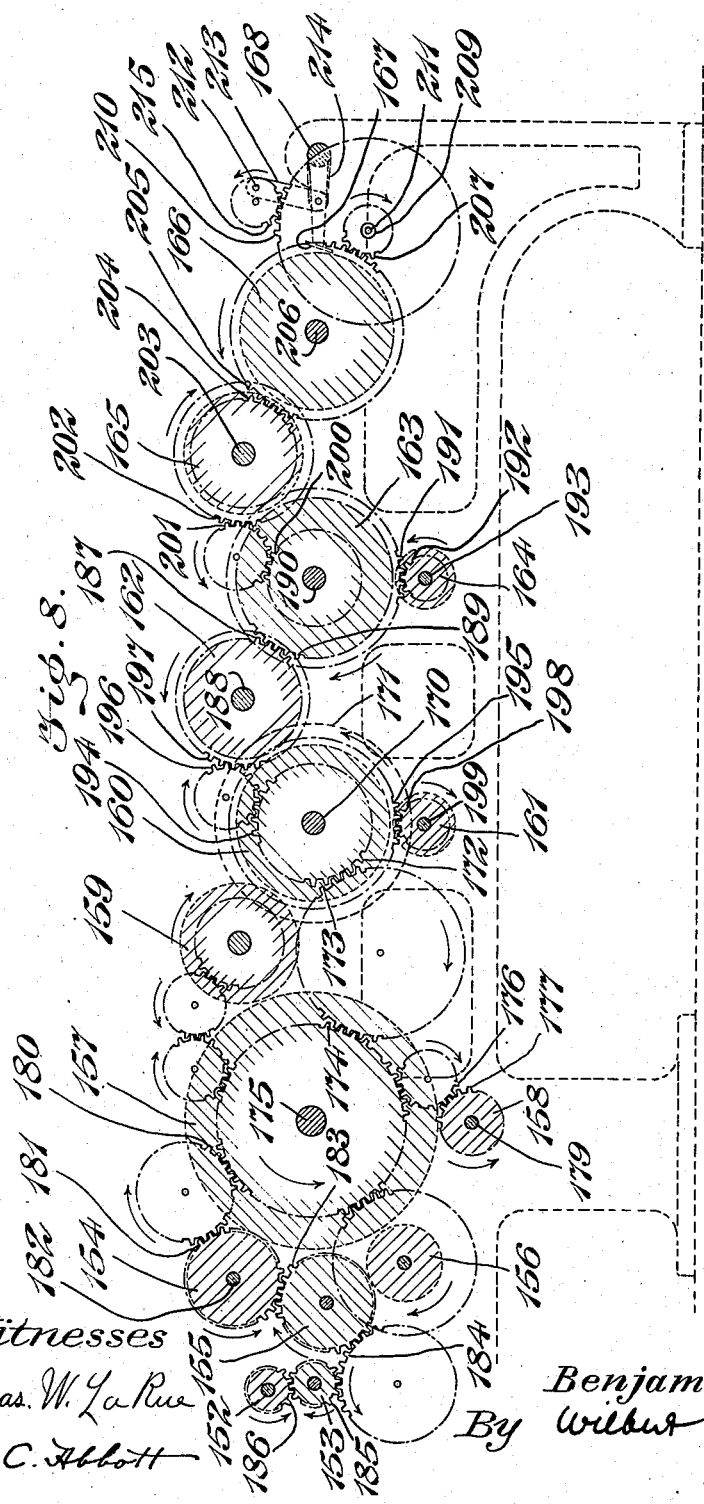

B. C. MUDGE.
MACHINE FOR TREATING FIBROUS PLANTS.
APPLICATION FILED OCT. 30, 1907.
905,345.
Patented Dec. 1, 1908.
8 SHEETS—SHEET 8.
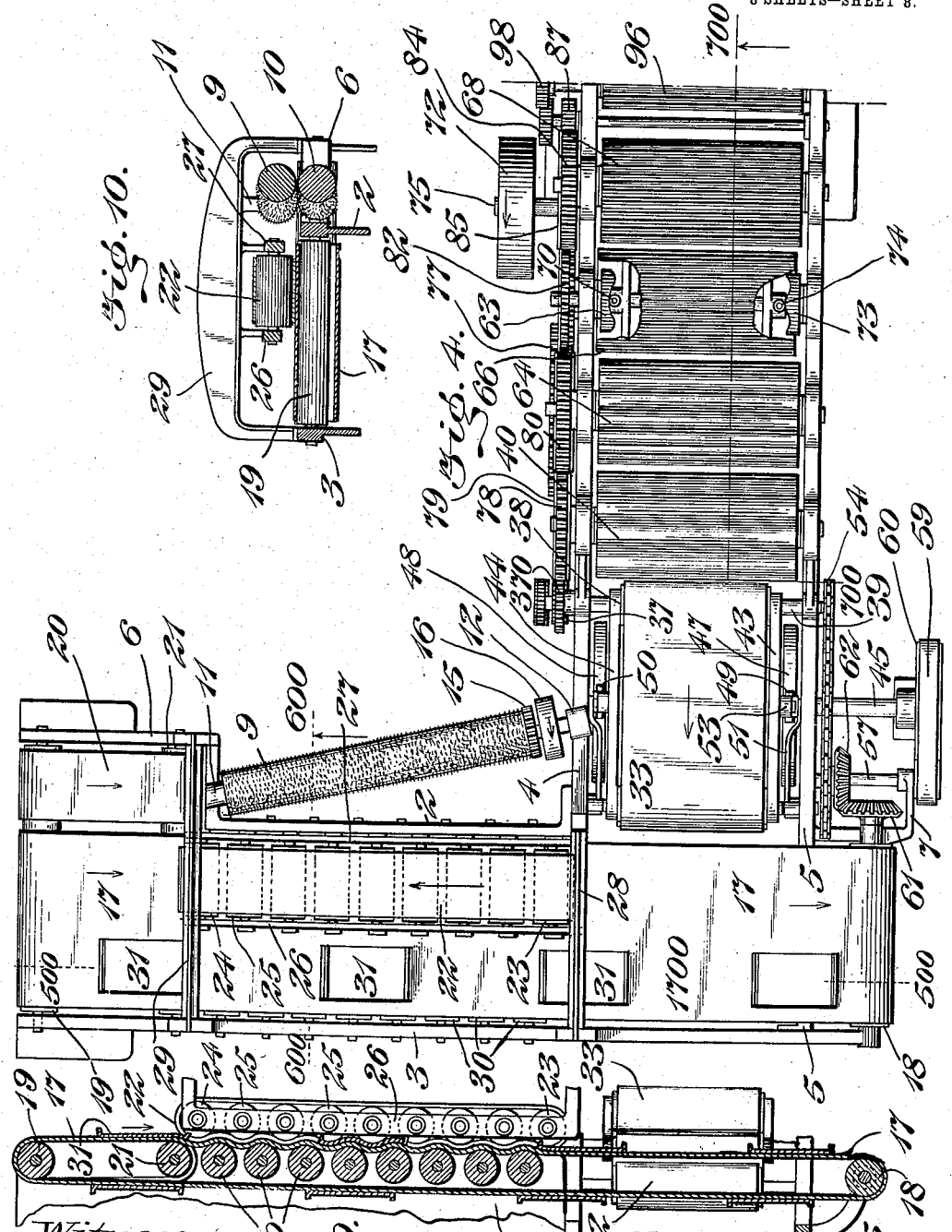
Witnesses
Chas. W. La Rue
A. C. Abbott
Inventor
Benjamin C. Mudge
By Wilbur M. Stone
Attorney

UNITED STATES PATENT OFFICE.

BENJAMIN C. MUDGE, OF LYNN, MASSACHUSETTS, ASSIGNOR TO OXFORD LINEN MILLS, OF NORTH BROOKFIELD, MASSACHUSETTS, A CORPORATION OF MAINE.

MACHINE FOR TREATING FIBROUS PLANTS.

No. 905,345. Specification of Letters Patent. Patented Dec. 1, 1908.

Application filed October 30, 1907. Serial No. 399,810.

*To all whom it may concern:*

Be it known that I, BENJAMIN C. MUDGE, a citizen of the United States, residing at Lynn, Essex county, Massachusetts, have invented certain new and useful Improvements in Machines for Treating Fibrous Plants, of which the following is a specification.

This invention relates to machines for treating fibrous plants such as flax, hemp and similar growths, for separating said plants into their component parts preparatory to their use in the industrial arts.

The object of my improvements is to furnish a machine into which the flax plants as gathered in the field, may be delivered, and which in one continuous operation will deseed and defibrate the plants thus separating them into their various commercial components, as seed, fiber and shives. As commonly practiced these several results are in part accomplished in several different places respectively and by a variety of distinct means. For instance the seed is threshed in or near the field where the plant is grown, then the deseeded stalks are transported to a mill where the larger and coarser portions of the straw are removed from the fiber, then the more or less shive loaded fiber is again transported to another mill where it is further cleaned and made more or less available for use in spinning and so forth. However, even with the large variety of machines now employed, the results accomplished are more or less crude and unsatisfactory.

With my improved machine it is necessary to handle the plants but once whereby much labor and time are saved and the various commercial components of the plant made available for use at comparatively small expense. Furthermore, by means of my improved machine, I am able to remove from the fiber a greater proportion of the shive elements than have heretofore been removed by any means within my knowledge. I thereby produce fiber of great cleanliness and high commercial value.

In the drawings accompanying this specification is illustrated one embodiment, and which may be the preferred embodiment, of my improvements. Therein Figures 1, 2 and 3 taken consecutively, represent a sectional side elevation of said machine. The partial section of Fig. 1 is taken on line 700, 700 of Fig. 4. The section of Fig. 2 is taken on line 800, 800 of Fig. 5. The section of Fig. 3 is taken on line 900, 900 of Fig. 6. Figs. 4, 5 and 6, taken consecutively, represent a plan view partly in section of said machine. Fig. 5 is shown with cover 100, toothed roll 94 and door 103 removed. Fig. 7 is a side elevation showing the means for actuating those parts shown in the sectional elevation of Fig. 2. Fig. 8 is a diagrammatic elevation showing the means for actuating the parts shown in the sectional elevation of Fig. 3. Fig. 9 is a sectional elevation on line 500, 500 of Fig. 4. Fig. 10 is a sectional elevation on line 600, 600 of Fig. 4.

For convenience of description I have divided the machine analytically into several elements but it will be understood that the material to be operated upon passes automatically and consecutively through all these elements in a continuous process. These elements I have called the deseeding mechanism, Figs. 1, 4, 9 and 10, the primary deshiving mechanism, Figs. 1 and 4, the shredding mechanism, Figs. 2, 5 and 7, and the refining mechanism, Figs. 3, 6 and 8.

*Deseeding mechanism.*—This mechanism, Figs. 1, 4, 9 and 10 comprises seed stripping means as brush rolls 9, 10 laid obliquely to the line of travel of the stalks to be deseeded. Upper brush 9 is mounted for rotation in suitable bearings 11, 12 on frames 29 and 4 respectively. Lower brush 10 is mounted for rotation in suitable bearings on frames 6 and 4 respectively. Said brush rolls are geared together at 15 and upper roll 9 is provided with a pulley 16 which may be driven by belt 8, Fig. 1, from any suitable source of power.

For conveying the stalks between and past brush rolls 9, 10 an endless conveyer belt 17 is provided. Said belt is mounted upon and carried by roll 18 at one end and roll 19 at the other end. Power is supplied for driving said belt through roll 18 as hereinafter described. An auxiliary feed-belt 20 is provided to support the seed ends of the stalks before they pass into engagement with stripping rolls 9, 10. Said belt 20 is supported at one end and driven by roll 19 and is supported at the other end by roll 21. Rolls 18, 19 and 21 are pivotally supported in suitable bearings in frames 5, 3 and 6 respectively. For holding the stalks securely upon belt 17 during the operation of deseeding, a pressure belt 22 supported on rolls 23, 24 is provided. For urging the working run of said belt 22 downwardly a series of pressure rolls, 25, 25, 25 is employed. These rolls and end rolls 23, 24 are pivotally supported in frames 26, 27 depending from bridge frames 28, 29. Rolls 23, 24 and 25 may be spring supported if desired so as always to exert a substantially uniform pressure on belt 22. Such showing is however omitted in the present drawings in the interest of simplicity. The upper or working run of feed belt 17 is supported to sustain the pressure of upper belt 22 by a series of rolls 30, 30, 30 pivotally mounted in frames 2, 3. To obtain uniformity of pressure between belts 17 and 22 I have shown the series of rolls under the working run of belt 17 staggered relative to the series of rolls over the working run of belt 22. Feed belt 17 is provided with spacing pieces 31, 31 so that the deseeded stalks may be fed intermittently or in increments and at right angles to their present direction of travel, to the next succeeding mechanism.

*Primary deshiving mechanism.*—For delivering the deseeded stalks from conveyer belt 17 to the primary deshiving mechanism a relatively short transfer belt 32 located adjacent to, but at right angles to the delivery end of belt 17, is provided. The upper or working run of said belt 32 travels in a direction away from and at a greater speed than said belt 17. Belt 32 is supported on suitable rolls pivoted in frames 4, 5. Forward roll 34 of said pair of rolls has gear 35 fixed to shaft 36 thereof and said gear 35 is driven by gear 37 in mesh therewith. Upper feed belt 33 coöperates with lower feed belt 32 to grip and feed the deseeded stalks from belt 17 to rolls 40, 41. Said belt 33 is supported at its forward end by roll 38 fixed on shaft 39 to which is fixed gear 37. The rearward end of belt 33 is carried on roll 42 pivotally supported in the rearward ends of arms 43, 44. The forward ends of said arms are pivoted on shaft 39. By this arrangement arms 43, 44, roll 42 and the rearward portion of belt 33 are adapted to oscillate upwardly and downwardly about shaft 39 as an axis. Said oscillation is effected by the following means. On shaft 45 pivotally supported in the lower part of frames 4, 5 and in floor bracket 46, are fixed cams 47, 48. For engagement with said cams rolls 49, 50 respectively are provided. Roll 49 is pivotally supported on the free end of lever 51 pivoted at 52 to frame 5. Link 53 connects lever 51 with arm 43. Roll 50 is similarly mounted and connected on the other side of the machine. By these means arms 43, 44, roll 42 and the rear portion of belt 33 may be moved up and down in accordance with the profile of duplicate cams 47, 48. Said cams are timed to give one complete oscillation to belt 33 for each passing "increment station" as 1700. of belt 17. Power is communicated to shaft 45 by the following means. On shaft 36 is fixed sprocket 54 from which chain 55 transmits power to sprocket 56 on shaft 57. Said shaft 57 is mounted for rotation in frame 5 and bracket 7 outstanding therefrom. From pulley 58 on shaft 57 belt 59 transmits power to pulley 60 on shaft 45. Power is communicated to roll 18 through miter gear 61 fixed to the shaft thereof and which gear meshes with miter gear 62 on shaft 57. The relative sizes of sprockets 54 and 56 are such that the surface speed of belt 32 is twice that of belt 17.

The primary deshiving mechanism comprises vertically arranged and horizontally successive pairs of crushing rolls preferably having lengthwise grooves and ribs thereon and which grooves and ribs decrease in size from pair to pair of said rolls. Also the members of each pair of rolls are so timed that a rib of one roll is opposite a groove of the other roll after the manner of intermeshing gear teeth. Also the successive pairs of rolls are staggered so that the plant stalks are bent sharply upwardly or downwardly as the case may be in passing from one pair of rolls to the next pair. For instance rolls 64, 65 have their zone of coaction materially higher than that of rolls 40, 41 while rolls 66, 67 have their zone of coaction materially lower than that of rolls 64, 65. Another feature of this primary deshiving mechanism is an endwise movement of roll 66 coincident with its rotary movement whereby a cross rubbing action is had on the stalks as they pass between rolls 66 and 67. This endwise movement is imparted to said roll by means of cam 63 fixed on frame 4 concentric with roll 66. The hub of said roll is provided with cam rolls 70, 71 for engagement with said cam. Also at the opposite end of said roll 66 complementary cam 73 is fixed to frame 5 and is engaged by cam rolls as 74 on roll 66. It is apparent that the ribs of roll 66 or of both 66 and 67 may be roughened or grooved circumferentially to increase the cross rubbing effect on the crushed and partly deshived plant stalks. Also it is apparent that other or all the rolls of the train may be similarly supplied with endwise movement if desired. Said rolls 40, 41, 64, 65 and so forth are mounted for rotation in suitable bearings in frames 4, 5 and for simplicity said bearings are shown as fixed, but it is apparent that the members of the several pairs may be mounted adjustably relative to each other respectively and that they may be urged to coaction by spring pressure, all by means well known in the art. Power is communicated to this train and to the deseeding and transfer belts by the following means. On the outboard end of shaft 75 is fixed pulley 72 to which power may be communicated by the usual belt not shown. Adjacent to said pulley and also fixed to shaft 75 is gear 76 meshing on the one hand with gear 85 of lower roll 69 and on the other hand with gear 83 of lower roll 67. Intermediate gear 77 on shaft 86 transmits power from gear 83 to gear 81 of lower roll 65 and to gear 79 of lower roll 41. Upper roll 68 has its gear 84 in mesh with gear 85, upper roll 66 has its gear 82 in mesh with gear 83, upper roll 64 has its gear 80 in mesh with gear 81 and upper roll 40 has its gear 78 in mesh with gear 79. Gear 37 of feed belt roll 38 is driven by gear 78 through intermediate gear 370.

*Shredding mechanism.*—This mechanism strips the crushed and partly deshived stalks into their component fibers and shive elements, conserving the fiber for passage through the further mechanism of the machine, and discharges the bulk of the shives. This mechanism comprises a relatively large toothed cylinder within a suitable casing and one or more fixed combs and one or more rotary combs or toothed rolls for operating upon the partly cleaned stalks that are rapidly carried around by the toothed cylinder. Said cylinder is represented at 90 Figs. 2 and 5 and has teeth 91 projecting from the periphery thereof at suitable intervals. Said cylinder is mounted for rotation in suitable bearings in side walls 88, 89 of the inclosing case. Fixed comb 92 having teeth 93 is mounted on side walls 88, 89 so that said teeth project into the zone of rotation of cylinder teeth 91. Also rotatably mounted in side walls 88, 89 above said cylinder 90 are toothed rolls or rotary combs 94, 95 for coaction with said cylinder as the stock is carried around thereon. The stock is fed from the primary deshiving mechanism to said shredding mechanism by means of feed rolls 96, 97 preferably corrugated lengthwise. Said rolls are revolubly mounted in side frames 4, 5 and are geared together by gears 98, 99 respectively. Power is communicated thereto by means of intermediate gear 87 meshing on the one side with lower roll gear 85 and on the other with gear 99 of lower feed roll 97. The upper portion 100 of the inclosing case, covers in main cylinder 90, toothed rolls 94, 95 and forms a receiving chamber 105 into which the fiber is discharged after treatment in this part of the machine. The bottom 101 of said case is formed concentric with cylinder 90 and is perforated to allow the passage of the shive portions of the stock while preventing the passage of the fiber portions thereof. Said shive portions fall into chamber 102 below screen 101 and are conveyed away by any suitable means such as exhaust fan 1030.

A door 103 is provided, when opened, (see dotted position 104 Fig. 2) to allow the passage of the fiber after treatment into receiving chamber 105. Therein table 106 having a toothed delivery edge receives the fiber. Any loose ends tending to remain in the cylinder chamber may be assisted onto table 106 by means of roll 107. Delivery roll 108 having suitable teeth for coaction with the teeth of table 106, is provided to comb off and feed the fiber downwardly from table 106. A doffer 109 frees said fiber from roll 108 and delivers it to transfer belt 110. A small roll 111 is provided to assist the proper delivery of said fiber to the conveyer belt.

Large cylinder 90 has fixed to shaft 116 thereof pulley 112 which may be driven by a belt not shown. Roll 94 is provided with a pulley 113 to which power is communicated by belt 114 from pulley 115 on shaft 116 of cylinder 90. Pulley 113 being of sufficient width of face, belt 117 thereon conveys power to pulley 118 of roll 95. Door 103 is caused to open and close at proper intervals by the following means. Said door is fixed to pivotal shaft 119 mounted in side walls 88, 89 and on the near outboard end of said shaft is fixed crank arm 121 (Fig. 7). On shaft 122 mounted for rotation in side wall 89 and bracket 123 are fixed cam 124 and gear 125. Said gear meshes with and is driven by gear 126 on feed roll shaft 120. Swinging arm 127 pivoted at 128 in side wall 89 bears at its free end roll 129 for engagement with cam 124. Swinging arm 127 is connected to crank arm 121 by link 130.

Roll 107 is pivotally mounted in side walls 88, 89 and bears on its rear outboard end (Fig. 5) gear 131, small pulley 132 and large pulley 133. By means of belt 134 power is communicated from pulley 135 on main cylinder shaft 116 to pulley 133. Delivery roll 108 is pivotally supported in side walls 88, 89 and has on the near outboard end of its shaft 136, pulley 137 to which power is communicated from pulley 132 by means of crossed belt 138. Doffer shaft 139 has arm 140 fixed to its outboard end and said arm is connected to crank pin 141 on gear 142 by means of link 143. Gear 142 on shaft 144 meshes with and is driven by gear 131. On the rear outboard end of shaft 144 is fixed gear 145 which, through intermediate gear 146, drives gear 147 on shaft 148 of roll 111. Said gear 147 also meshes with and drives gear 1480 on shaft 149 of apron roll 150. Transfer belt 110 is supported at its delivery end by roll 151 pivoted in side frames 158, 159.

*Refining mechanism.*—This mechanism comprises a series of coacting refining cylinders and transfer rolls having metallic teeth arranged in circumferential rows thereabout respectively. The spacing of the teeth in the rows decreases in distance from roll to roll, from the entrance end of this portion of my improved machine, and the distance of adjacent rows from each other also decreases in the same manner. These features are apparent in the drawings (Figs. 3 and 6) but for clearness of illustration such showing is greatly exaggerated over actual practice. A special feature of this division of the machine is the scraper rolls situated below and for coaction with the refining rolls respectively. A refining cylinder, scraper roll and transfer roll comprise one element in this division and it is apparent that said elements may be increased or decreased in number according to specific needs. The last cylinder of this refining mechanism is in the nature of a doffer cylinder and the refined fiber is stripped therefrom by the usual doffer 167.

Adjacent to the delivery end of transfer belt 110 are small feed rolls 152, 153. Succeeding these, running at the same surface speed and suitably located relative to first refining cylinder 157, to deliver the fiber thereto, are self-stripping feed rolls 154, 155. Below feed roll 155 is located lickerin 156 for wiping the fiber securely onto cylinder 157. Said cylinder 157 rotates in the direction of its teeth inclination and has a surface speed greater, preferably about four times, than feed rolls 154, 155 and lickerin 156 has a surface speed greater than said feed rolls but less than said cylinder. Below cylinder 157 is scraper roll 158 for loosening up and scraping off the smaller shives that may still be attached to the fiber. This roll is provided with a plurality of longitudinal blades and is driven at a relatively moderate speed in a direction opposite at their point of coaction to that of said cylinder so that every portion of the fiber on said cylinder is worked by said roll in passing. Transfer roll 159 has hooked teeth and travels in the same direction at their point of coaction but somewhat faster than cylinder 157, whereby the fiber is removed from said cylinder and delivered to smaller cylinder 160. Said cylinder 160 runs in a direction opposite to the direction of its teeth inclination but in the same direction at the point of coaction and somewhat slower than transfer roll 159. Said cylinder 160 is provided with scraping roll 161 thereunder running in the same direction at their point of coaction but at a considerably greater speed than said cylinder 160. Transfer roll 162 rotates in the opposite direction at the point of coaction therewith, to cylinder 160 and strips the fiber therefrom, and in the same direction but faster than and thereby against the teeth of cylinder 163, whereby said transfer roll 162 will deliver its burden of fiber to said cylinder 163. Cylinder 163 is provided with scraping roll 164 thereunder, running in the same direction at the point of coaction therewith and at a much greater surface speed. Transfer roll 165 rotates in the opposite direction, at the point of coaction therewith, to cylinder 163, thereby lifting the fiber therefrom. Said transfer roll runs in the same direction at its point of coaction therewith, as doffer cylinder 166 but slower, whereby said transfer roll delivers its burden of fiber to said doffing cylinder, which runs in a direction opposite to the direction of its teeth inclination. Doffer 167 oscillating through a small arc about its axis 168 coacts with said doffer cylinder to doff off the fiber therefrom.

While for simplicity of illustration the cylinders, feed, transfer and scraper rolls are shown as mounted in fixed bearings, it is customary in practice to mount said cylinders and rolls relatively adjustable. As suitable means for such adjustment are well known in the art and form no part of the present improvements, they are omitted. Said cylinders and rolls of this refining mechanism are pivotally mounted in side frames 1580, 1590 and are actuated from shaft 170 by several trains of gearing as follows: I will first describe those trains of gears which are on the rearward side of the machine (upper side of Fig. 6), see Figs. 6 and 8. Shaft 170 has cylinder 160 fixed thereon and on its rearward outboard end pulley 171 and gear 172 are fixed. Power may be supplied to said pulley by the usual belt not shown. Gear 172 through intermediate gear 173 drives gear 174 fixed to shaft 175 of cylinder 157. Gear 174 through intermediate gear 176 drives gear 177 fixed to shaft 179 of scraper roll 158. Also said gear 174 through intermediate 180 drives gear 181 fixed to shaft 182 of upper feed roll 154. Gear 183 of lower feed roll 155 meshes above with said gear 181 and below with intermediate gear 184 which gear in turn meshes with gear 185 of small lower feed roll 153. Small upper feed roll 152 is driven through its gear 186 in mesh with gear 185 (Figs. 2, 5, 6, 7 and 8). Gear 187 fixed to the rear end of shaft 188 of transfer roll 162 meshes with gear 189 fixed to shaft 190 of cylinder 163. Said shaft 188 is driven from pulley shaft 170 by gearing on the front of the machine to be hereinafter described. Said shaft 190 also has fixed thereto, outboard gear 189, gear 191 meshing with gear 192 fixed to shaft 193 of scraping roll 164.

I will now describe those trains of gears on the front of the machine. On the forward end (lower end Fig. 6) of pulley shaft 170 are fixed gears 194, 195. Gear 194 through intermediate 196 drives gear 197 fixed to shaft 188 of transfer roll 162. Gear 195 meshes with gear 198 fixed to shaft 199 of scraper roll 161. Gear 200 fixed to front end of shaft 190 of cylinder 163, through intermediate 201 drives gear 202 fixed to shaft 203 of transfer roll 165. Outboard gear 202 on shaft 203 is fixed gear 204 which meshes with gear 205, fixed to shaft 203 of doffer roll 166. Said gear 205 also meshes with small gear 207 fixed to sleeve 209 of large gear 210. Sleeve 209 turns freely on stud 211 outstanding from frame 1590. Large gear 210 meshes with gear 215 bearing crank pin 212. Said pin is connected to arm 214 of doffer shaft 168 by link 213.

*Operation.*—The fibrous plant stalks are laid on the entrance end of belt 17 (Figs. 4 and 9) and with their seed bearing ends on auxiliary belt 20. Said stalks are preferably provided in a sufficient quantity to suitably fill the space between adjacent spacing pieces 31, 31. Said stalks are carried forwardly on said belt 17 and presently pass under upper belt 22. Said belts 17, 22 by the aid of rolls 30, 30, 25, 25 tightly grip the plant stalks and carry them onwardly thereby passing their seed bearing ends between brush rolls 9, 10. Said brush rolls strip the seeds therefrom beginning with those portions of the seed area of the stalks more remote from the tops thereof and by the inclined position of said brush rolls finishing with the tips of the stalks. Continuing their progress the now deseeded stalks pass out from under belt 22 and are carried onward by belt 17. The deseeded ends of the stalks pass onto transfer belt 32, upper or gripping belt 33 being then in its raised position (Fig. 1). When all of the ends of this particular increment of stalks lying between adjacent spacing pieces 31, 31 have passed onto belt 32, cam rolls 49, 50 drop into depressed portions of their respective cams 47, 48 and upper belt 33 thereby is quickly lowered onto the leading ends of said stems which are thus gripped between said belt and belt 32 and fed onwardly in the direction of their length, at right angles to their previous direction on belt 17 and at double their former speed. Said stalks are now carried onwardly between belts 32, 33 and their leading ends delivered into the bite of crushing rolls 40, 41. At the same time cam rolls 47, 48 pass to high parts of their respective cams and the rearward end of belt 33 is lifted for the reception thereunder of the next succeeding increment of deseeded stalks. After passing between rolls 40, 41 and being primarily crushed and bent back and forth by the relatively large ribs and grooves of said rolls the stalks pass sharply upwardly into the bite of rolls 64, 65. By this sharply upward bending, such relatively large shive portions as may have been loosened by rolls 40, 41 are crowded out and fall away. Between rolls 64, 65 the stalks are further crushed and bent back and forth by the relatively smaller ribs and grooves of said rolls. The stalks now pass sharply downwardly whereby more of the shive elements are discharged, and into the bite of the third pair of rolls 66, 67 where they are further acted upon in a similar manner as by rolls 40, 41 and 64, 65 respectively except that as rolls 66, 67 are nearer together and have relatively smaller ribs and grooves than the respective members of previous pairs of rolls, said stalks are more minutely treated thereby. Also by the endwise reciprocation of upper roll 66 a cross-rubbing action is had on said stalks whereby the now broken straw and shive portions thereof are more fully broken and loosened from the fiber. From said rolls 66, 67 the stock passes sharply upward, whereby the loosened shives are further discharged, and into the bite of rolls 68, 69. Said rolls have ribs and grooves smaller and said rolls are closer together than rolls 66, 67 just preceding. By means of said rolls 68, 69 the remaining shives are more minutely broken and loosened. The stock passes thence between feed rolls 98, 99 and is delivered to the shredding mechanism. Here it is driven around at high speed by toothed cylinder 90 and is shredded and beaten by toothed rolls 94, 95 and by teeth 93 of comb 92 as said stock is carried against and past them by toothed cylinder 90. Any shive portions that have been carried over with the fiber into this mechanism are thus beaten and combed out and fall onto screen 101 and through the openings thereof, and are carried away by exhaust fan 1030. The openings in screen 101 are insufficient in size to permit the passage of the fiber therethrough.

It will be understood that the stock has been proceeding through the machine thus far in increments, as determined by the intermittent delivery from belt 17. Therefore any one increment of stock may and does remain under the action of the shredding mechanism until the next succeeding increment of stock is presented for delivery thereto. Thus by suitably spacing and timing the movement of the stock in the preceding portions of the machine, sufficient time is given for the thorough treatment thereof by the shredding mechanism. Just prior to the delivery by feed rolls 96, 97 of the next succeeding increment of stock, door 103 is opened and the increment of stock being treated by the shredding mechanism is discharged by centrifugal force into receiving chamber 105, and onto table 106 and delivery roll 108. Small roll 107 assists in the discharge of any loose ends of the fiber that may be dilatory in their exit. Discharge roll 108 feeds the fiber downwardly from the toothed edge of table 106 and said stock is combed therefrom by doffer 109 from whence it passes in a continuous web onto conveyer belt 110. Any tendency of the stock to follow around on roll 108 is counteracted by small stripping roll 111. From belt 110 the fiber is delivered into the bite of feed rolls 152, 153 and thence to delivery rolls 154, 155. The fiber passes downwardly over roll 155 and is taken therefrom by large cylinder 157 onto which it is licked by roll 130

156. The fiber is thereby laid between the rows of teeth of said cylinder 157 and the shive portions more or less forced toward the peripheries of the teeth. Said cylinder then conveys the fiber to and past scraper roll 158 by which the projecting shive portions are scraped and brushed off. Said fiber then passes with said cylinder 157 to transfer roll 159 by which it is removed and delivered to cylinder 160. As the teeth of said cylinder are finer and the rows thereof more closely arranged than on cylinder 157, the remaining shive portions are further urged toward the tooth points in position to be acted upon and removed by scraper roll 161 in their passage thereby. The fiber is then transferred from cylinder 160 to cylinder 163 by roll 162. Said cylinder 163 having finer teeth and the rows thereof closer spaced than in cylinder 163, those shives still clinging to the fiber are urged outwardly and are scraped off by roll 164 as they pass thereto. By means of transfer roll 165 the now substantially deshived fiber is delivered to doffer roll 166 from which it is doffed by doffer comb 167.

I claim:—

1. In a machine for treating fibrous plants the combination of a continuously actuated conveyer belt having stations thereon for the reception of the plant stalks, means for holding said stalks thereon, means for stripping the seeds from said stalks; a series of breaking rolls for separating the shives from the fiber and continuously actuated means for intermittently transferring the stalks from the conveyer belt to the breaking rolls.

2. In a machine for treating fibrous plants the combination of a conveyer belt, having stations thereon for the reception of the plant stalks, means for continuously actuating said belt, means comprising a pressure belt and a series of pressure rolls for holding the plant stalks thereon, means for stripping the seed from the plant stalks while being held on said conveyer belt, means for breaking the stalks to separate the shives from the fiber and continuously actuated means for intermittently transferring the stalks from the conveyer belt to the breaking means.

3. In a machine for treating fibrous plants the combination of a conveyer belt having stations thereon for the reception of the plant stalks, means for continuously actuating said belt, a transfer belt located in substantially the same plane as the conveyer belt but at right angles thereto, a gripping belt over the transfer belt for coaction therewith and means for raising and lowering the rearward end of the gripping belt to admit and grip the plant stalks between said transfer and gripping belts and means for continuously actuating said belts.

4. In a machine for treating fibrous plants the combination of a conveyer belt having stations thereon for the reception of the plant stalks, means for continuously actuating said belt, means for holding the plant stalks thereon, means for stripping the seed from the plant stalks while being held on said conveyer belt; a transfer belt located in substantially the same plane as the conveyer belt but at an angle thereto, a gripping belt over the transfer belt for coaction therewith and means for raising and lowering the rearward end of the gripping belt to admit and grip the plant stalks between said transfer and gripping belts and means for continuously actuating said belts.

5. In a machine for treating fibrous plants the combination of a transfer belt and a gripping belt, means for raising and lowering the rearward end of the gripping belt to admit and grip the plant stalks between said belts while maintaining the coaction of said belts at their forward ends respectively and means for continuously actuating said belts.

6. In a machine for treating fibrous plants the combination of a conveyer belt, a pair of continuously actuated coacting belts arranged at right angles to the conveyer belt, means for periodically separating said coacting belts from each other at one end of their zone of coaction while maintaining coaction at the other end of said zone and means for actuating the conveyer belt.

7. In a machine for treating fibrous plants the combination of a transfer belt and a gripping belt thereover both actuated at one uniform speed, means for raising and lowering the rearward end of the gripping belt relative to the transfer belt; a plurality of pairs of coacting grooved rolls arranged to receive the plant stalks from the transfer belt, each pair of said rolls having its zone of coaction in a different plane from the zone of coaction of its next adjacent pair, means for actuating the rolls and means for imparting endwise movement to one or more of said rolls.

8. In a machine for treating fibrous plants the combination of a conveyer belt, having stations thereon for the reception of the plant stalks, means for actuating said belt, means for holding the plant stalks thereon, means for stripping the seed from the plant stalks while being held on said conveyer belt, a plurality of pairs of coacting grooved rolls each pair of said rolls having its zone of coaction in a different plane from the zone of co-action of its next adjacent pair, means for actuating the rolls, means for imparting endwise movement to one or more of said rolls and intermittently coacting transfer belts for transferring the plant stalks from the conveyer belt to the coacting grooved rolls and means for actuating the transfer belts.

9. In a machine for treating fibrous plants the combination of a conveyer belt having stations thereon for the reception of the plant stalks, means for actuating said belt, means for holding the plant stalks thereon, means for stripping the seed from the plant stalks while being held on said conveyer belt, a transfer belt located in substantially the same plane as the conveyer belt but at an angle thereto, a gripping belt over the transfer belt for coaction therewith and means for raising and lowering the rearward end of the gripping belt to admit and grip the plant stalks between said transfer and gripping belts and means for actuating said belts; a plurality of pairs of coacting grooved rolls arranged to receive the plant stalks from the transfer belt, each pair of said rolls having its zone of coaction in a different plane from the zone of coaction of its next adjacent pair, means for actuating the rolls and means for imparting endwise movement to one or more of said rolls.

10. In a machine for treating fibrous plants the combination of a containing case, a toothed cylinder and a rotary comb for coaction therewith, means for actuating said cylinder and comb, means for intermittently feeding stock to said cylinder and means for intermittently discharging stock therefrom; a table for receiving the discharged stock, a toothed roll for delivering the stock continuously therefrom and means for actuating the toothed roll and means for removing the stock from said roll.

11. In a machine for treating fibrous plants the combination of a plurality of toothed cylinders having the teeth thereof arranged in circumferential rows and having the distance between adjacent rows of teeth on any given cylinder less than said distance on its next preceding cylinder, means for actuating the cylinders, a transfer roll located between adjacent cylinders for transferring the fiber from one cylinder to the next, means for actuating said transfer rolls, a scraper roll adjacent to each toothed cylinder for co-action therewith, means for actuating the scraper rolls and means for removing the fiber from the last cylinder.

12. In a machine for treating fibrous plants the combination of a conveyer belt having stations thereon for the reception of the plant stalks, means for actuating said belt, means for holding the plant stalks thereon, means for stripping the seed from the plant stalks while being held on said conveyer belt; a plurality of pairs of coacting grooved rolls each pair of said rolls having its zone of coaction in a different plane from the zone of coaction of its next adjacent pair, means for actuating the rolls, and means for imparting endwise movement to one or more of said rolls; intermittently operative transfer belts for transferring the plant stalks from the conveyer belt to the coacting grooved rolls and means for actuating the transfer belts; a containing case, a toothed cylinder and a comb for coaction therewith, means for actuating said cylinder, means for intermittently feeding stock to said cylinder and means for intermittently discharging stock therefrom; a table for receiving the discharged stock, a toothed roll for delivering the stock continuously therefrom, means for actuating the toothed roll and means for removing the stock from said roll; a plurality of toothed cylinders having the teeth thereof arranged in circumferential rows and having the distance between adjacent rows of teeth on any given cylinder less than said distance on its next preceding cylinder, means for actuating the cylinders, a transfer roll located between adjacent cylinders for transferring the fiber from one cylinder to the next, means for actuating said transfer rolls, a scraper roll adjacent to each toothed cylinder for coaction therewith, means for actuating the scraper rolls and means for removing the fiber from the last cylinder.

Signed this twenty-sixth day of October, nineteen hundred and seven (1907) at 19 Park row, New York, before two subscribing witnesses.

BENJAMIN C. MUDGE.

Witnesses:
 WILBUR M. STONE,
 ELSIE C. DUFF.